Aug. 6, 1935.  D. C. DUNDON  2,010,144
SPHEROMETER
Filed May 18, 1932  2 Sheets-Sheet 1
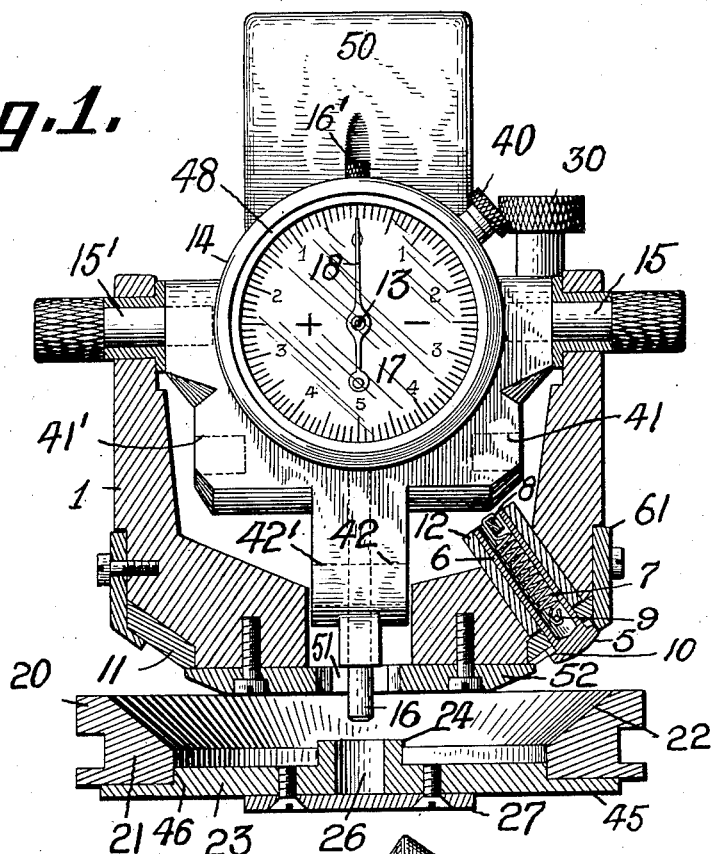
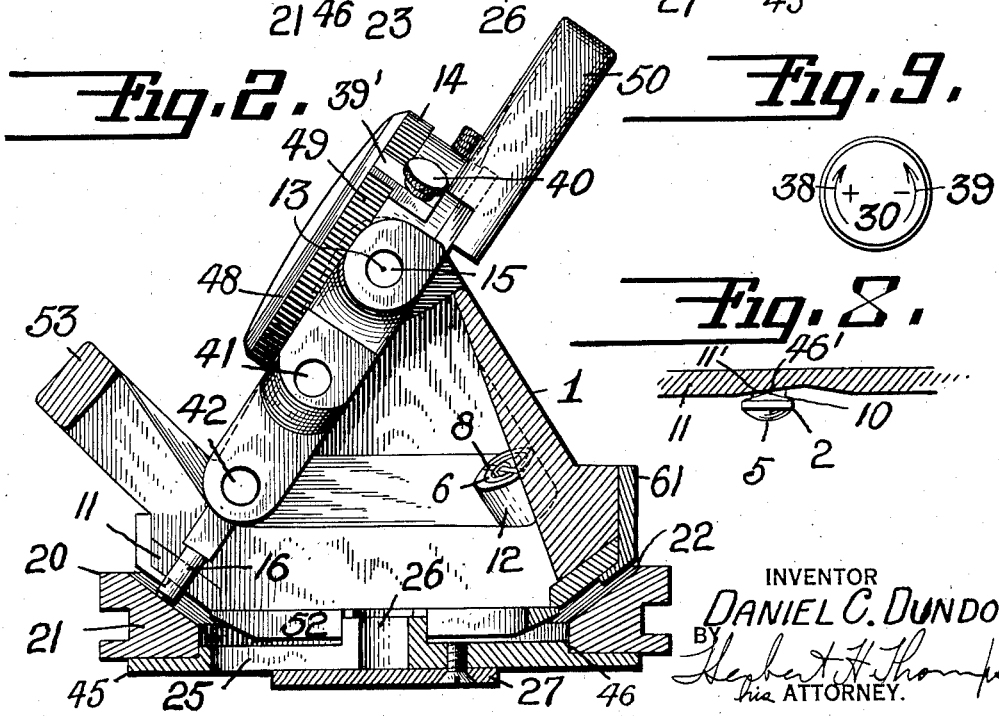
INVENTOR
DANIEL C. DUNDON.
BY
his ATTORNEY.

Aug. 6, 1935.　　　D. C. DUNDON　　　2,010,144
SPHEROMETER
Filed May 18, 1932　　　2 Sheets-Sheet 2
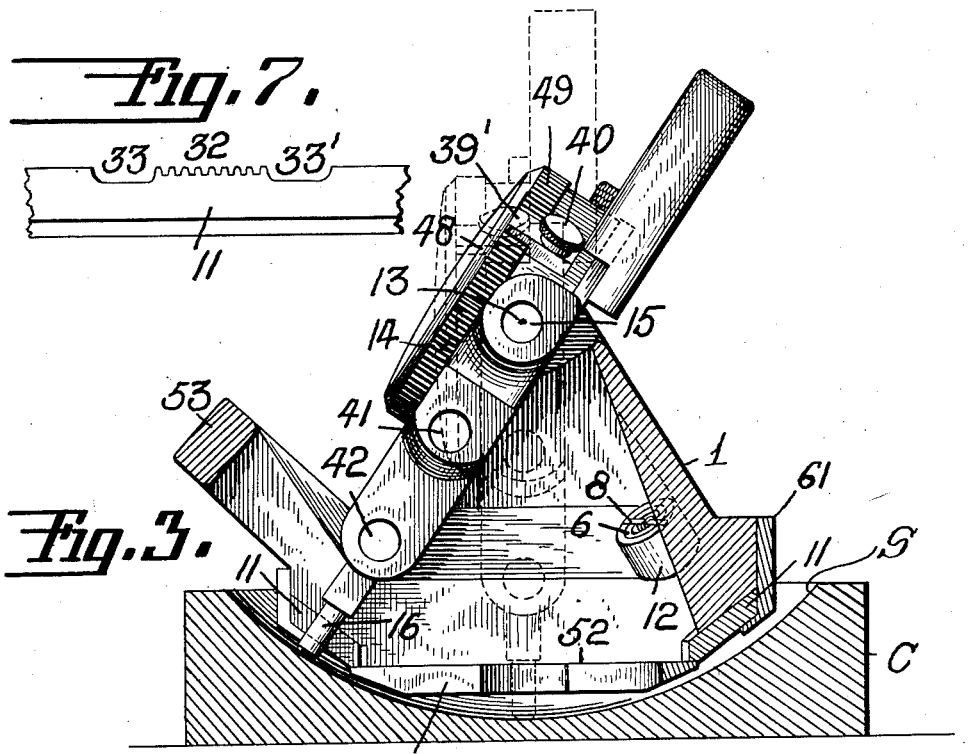
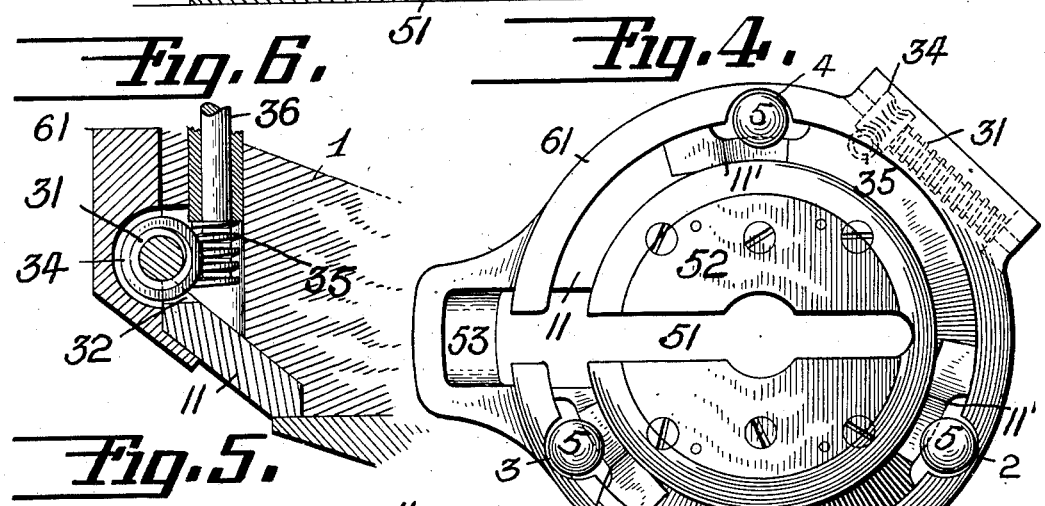
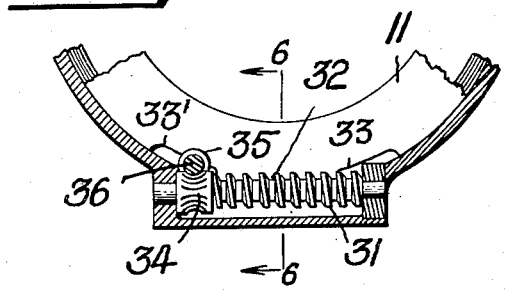
INVENTOR
DANIEL C. DUNDON.
BY
his ATTORNEY.

Patented Aug. 6, 1935

2,010,144

UNITED STATES PATENT OFFICE 2,010,144

SPHEROMETER

Daniel C. Dundon, Floral Park, N. Y., assignor to Sperry Gyroscope Company, Inc., Brooklyn, N. Y., a corporation of New York Aplication May 18, 1932, Serial No. 611,980

5 Claims. (Cl. 33—172)

This invention relates to accurate measuring instruments for measuring the curvature of surfaces, such as spherical cups or hollow spheres, such devices usually being known as spherometers. One of the objects of the invention is to devise an instrument of extreme accuracy in which the radius of curvature of the surface being measured may be read directly on a graduated dial without calculation or interpolation. Another object of the invention is to simplify spherometers and improve the accuracy of the same. Further objects will become apparent as the description proceeds.

Referring to the drawings showing one preferred form of the invention,

Fig. 1 is a vertical section through my spherometer and the gauge block therefor, the gauge or indicator proper, however, being shown in front elevation.

Fig. 2 is a section taken at right angles to Fig. 1, the gauge being shown in side elevation.

Fig. 3 is a view similar to Fig. 2 showing the gauge being used to measure the curvature of a cup.

Fig. 4 is a bottom plan view of my spherometer.

Fig. 5 is a detailed horizontal section through the adjusting means for the feet of the gauge.

Fig. 6 is a detailed section taken approximately on line 6—6 of Fig. 5.

Fig. 7 is a detail of a portion of the adjusting ring for the feet.

Fig. 8 is a detail of one of the cam surfaces on the adjusting ring and the adjacent under surface of one of the feet.

Fig. 9 is a top view of the adjusting thumb piece for the adjusting ring.

The main frame 1 of my spherometer is of generally cylindrical shape with a hollow interior open at the bottom and front to form a radial slot 51. A U-shaped extension 53 may be formed at the front of the base to stiffen the frame and act as a limit stop for the gauge proper. Said frame has near the bottom thereof a plurality of spaced feet 2, 3 and 4, which are placed at equal angles to the base so that their surfaces will lie tangential to the inner surface S of the cup C (Fig. 3), the radius of which is being measured. As shown, each foot has a rounded bearing surface 5 and a hollow cylindrical shank 6 within which is disposed a tension spring 7. Said spring is fastened at its top to a fixed bar 8 and at its bottom to a pin 9 secured to the sleeve so that each foot is normally drawn inwardly with the inner annular shoulder 10 thereof resting against the surface of a ring 11, the sleeve 6 being slidably mounted in the outer fixed or guide sleeve 12 supported in a radial aperture in the frame 1. Bar 8 is shown as extending across the top of sleeve 12 above sleeve 6. The longitudinal axes of all of sleeves 6 preferably intersect in a common point 13, which point is also normally the center of curvature of the surface S being measured.

Accurate adjustment of the position of the feet is obtained by providing bevel or cam surfaces 11' on the ring 11 under each head 5 of the feet, said ring being rotatably held between outer split ring 61 and slotted bottom plate 52. Preferably the under surface of the head is tapered so as to form a line contact 46' between the head and cam surface. The ring 11 is preferably accurately adjusted by a threaded or worm shaft 31 which meshes with worm teeth 32 cut in the upper edge of a short portion of the ring 11 (see Figs. 5 and 6), the ring being cut away for a short distance on each side of the worm as at 33, 33' to permit its adjustment. The worm shaft 31 is rotated from a small worm wheel 34 mounted thereon with which a worm 35 on a vertical shaft 36 meshes. At its top said shaft 36 is provided with thumb piece 30 for manual adjustment, the thumb piece being rotated in the direction of arrow 38 to advance the feet and in the direction of the arrow 39 to retract the feet.

The gauge element 14 proper is pivoted on horizontal bearings 15, 15' in the frame 1, the axis of said bearings lying preferably in the same horizontal plane as the point 13 of intersection of said axes of the feet. The gauge is provided with a spring pressed foot or stem 16, the vertical movements of which are very accurately registered on the dial 17 by the pointer 18. Said dial is preferably graduated in ten thousandths of an inch or other micrometer unit, one complete revolution of the dial being one one-hundredth of an inch in the embodiment shown.

The gauge itself may be of any known standard construction, the shaft 16 running up through the gauge and out at the top where it is knurled at 16'. The dial is also annularly adjustable on the face of the instrument to adjust the zero point, the dial being mounted in the cover 48 which may be adjusted around the gauge and clamped in any position by the clamp 39' and clamping screw 40, the former engaging serrations 49 on the edge of cover 48. The gauge is also shown as provided with additional lateral holes 41, 41' and 42, 42' so that it may be used for smaller work if desired in connection with smaller supporting frames. Back plate 50 forms a convenient finger hold for swinging the gauge about pivots 15, 15', and is preferably made of insulating material so that the heat from the hand does not cause variations in the gauge. The plane of pivots 15, 15' and of slot 51 are preferably placed so that stem 16 when swung upwardly preferably lies fairly close to one of feet 3 so that its reading in that position always corresponds to the distance between the feet and point 13, i. e. to the set or predetermined radius of curvature set by standard block 20, as will now be described.

The standard block referred to is preferably formed of an annular ring 21 having a conically beveled inner face 22. Fitting within the bottom of said ring is a circular plate 23 having a hub portion 24 and an annular flange 45 forming an annular shoulder 46 which snugly fits within the ring 21 so that the plate may be removed from the ring and turned to another position and snapped back into place. There is also a radial slot 25 through the central portion of the plate and hub (Fig. 2). The axial bore 26 through the hub is preferably closed at the bottom by plate 27. The upper surface of said plate lies in a plane perpendicular to the axis of the inverted cone surface 22 of ring 21, and this conical surface and the center of the surface of plate 27 lie tangential to a sphere, to the dimensions of which the standard block is designed. It should be plain, therefore, that if my gauge is set into this standard block and the length of the feet adjusted until the indicator reading is the same at both the perpendicular and side tangential points that the length of the feet measured from the center point 13 to the contact surfaces is exactly equal to the radius desired.

In order to simplify the operations, I find it preferable to adjust the gauge for a zero reading when on the standard block so that when the gauge is used on an unknown surface it will read plus, when the radius of the surface is too great, and minus, when the radius is too small, the dial reading directly excess or shortage in radius. To effect this the master block is so designed that when the gauge is set thereon with the three feet 2, 3 and 4 resting on the bevel surface 22 and the stem 16 at the center of plate 27, the stem 16 is pushed upwardly through a predetermined distance, say two hundredths of an inch, thereby rotating the pointer 18 through two revolutions. The gauge is then rotated about the pivots 15, 15' to the position shown in Fig. 2 where the gauge should again be brought to the same position as when vertical as its minimum reading when in the plane of intersection of the feet and the surface 22. If it does not read the same, the feet are adjusted until the same reading is obtained. Then clamp 40 is loosened and dial 17 turned so that the hand 18 reads zero.

The gauge is then properly adjusted to measure the radius of curvature of any concave surface of about the same curvature as predetermined, such as S in Fig. 3. To do this the gauge is placed on the work C and swung about the pivots 15, 15', the readings on the dial being carefully noted. If the dial remains at zero, this indicates that the curvature of the surface is exactly the required amount and that the surface is uniform. If it reads less than zero in the vertical position, i. e., rotates clockwise on the minus side of zero, while remaining at zero in the inclined position, it indicates that the curvature is greater than the gauge is set for and to obtain the exact radius of curvature the feet are adjusted in the plus direction by rotating the knob 30 until the gauge reading remains substantially uniform throughout the swinging movements of the gauge. The gauge will then have rotated counter-clockwise past zero (under the conditions assumed) and show the exact radius of curvature on the plus side in excess of the original setting. If no such adjustment can be obtained, irregularity of the surface is indicated, the gauge showing the high spots as minus and the low spots as plus.

My gauge is hence especially adapted for use as a comparator for constructing a number of concave spherical surfaces to an exact predetermined radius, the gauge showing up simply and directly the error in the radius of curvature of the surfaces as the plus or minus difference between the final reading of the gauge and zero. The entire surface may be explored by successively placing the gauge in different positions in the cavity and the indicator swung the full length of its arc for all positions.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a spherometer, a frame, a plurality of spaced adjustable feet thereon providing a three point support on the surface being measured, a gauge pivotally mounted therein to swing about an axis parallel to the normal plane of support provided by said feet and which includes the point of intersection of radii from the points of intersection of said feet and the surface being measured, said gauge having a central radially movable foot and means for measuring the position thereof, and means including a single screw thread means for radially adjusting said feet equally.

2. In a spherometer, a frame, a plurality of spaced adjustable feet thereon, a gauge pivotally mounted therein to swing about a horizontal axis, a ring lying under each foot and having inclined cam surfaces thereon, and means including a thumb piece for rotating said ring to adjust each foot simultaneously and equally.

3. In a spherometer, a frame, a plurality of spaced feet thereon, a gauge pivotally mounted therein to swing about a horizontal axis, means for mounting said feet for adjustment along radii having a common center included in said axis, a ring lying under the head of each foot and having inclined cam surfaces thereon, and means including a thumb piece for rotating said ring to adjust each foot simultaneously and equally.

4. In a spherometer, a frame, a plurality of spaced adjustable feet thereon providing a three point support for said frame on the three dimension curved surface being measured, and a gauge pivotally mounted therein to swing about an axis parallel to the normal plane of support provided by said feet and which includes the point of intersection of radii from the points of intersection of said feet and said surface, said gauge having a central axially movable foot and having means for measuring the axial movement of said foot.

5. In a spherometer, a frame, a plurality of spaced adjustable feet thereon providing a three point support for said frame on the three dimensional curved surface being measured, and a gauge pivotally mounted thereon to swing about an axis parallel to the normal plane of support provided by said feet and which includes the point of intersection of radii from the points of intersection of said feet and said surface, said gauge having a central axially movable foot and having means for measuring the axial movement of said foot, and an insulated handhold for oscillating the gauge about its pivots.

DANIEL C. DUNDON.